United States Patent Office 2,720,468
Patented Oct. 11, 1955

2,720,468

PROCESS FOR GELLING

Comer Drake Shacklett, Roselle, N. J., assignor to E. I. du Pont de Nemours and Company, Wilmington, Del., a corporation of Delaware No Drawing. Application May 28, 1954,
Serial No. 433,286

14 Claims. (Cl. 117—34)

This invention relates to a process for gelling synthetic hydroxyl polymers. More particularly it relates to a process for gelling water-soluble and hydrophilic hydroxyl containing polymers. Still more particularly, it relates to such a process wherein stable, water-soluble organic titanium complexes are used. An important aspect of the invention is concerned with gelling thin layers of aqueous solutions or dispersions of such hydroxyl polymers.

Polyvinyl alcohol and its acetals are important industrial polymers, but due to their solubility in water they have some shortcomings for various commercial uses. The acetals, including acetals containing color-former nuclei, have important uses in photographic elements and because of their uniformity are preferable to gelatin. However, it is desirable that their solubility characteristics be reduced without impairing their photographic characteristics. In adidtion, rapid gelation of dilute solutions (1 to 10%) of such polymers is desirable to aid in obtaining uniform coatings by skim coating techniques. Attempts to accomplish this by means of borate ions in alkaline solutions have been made.

Various titanate compounds have been used to gel hydroxyl polymers but they require strongly acidic solutions in order that the titanium will remain in solution and react with the hydroxyl groups. The acid conditions militate against their use in the manufacture of photographic elements for various reasons, including the facts that they desensitize photographic emulsions, interfere with conventional developing operations, have a hydrolytic action on polyvinyl acetal color formers and have a deleterious effect on color-developed dye images.

It is accordingly an object of this invention to provide a new and practical process for gelling synthetic hydroxyl polymers. Another object is to provide such a process which can be carried out between pH 4 and 10. A related object is to provide such a process which can be carried out under essentially neutral conditions. Yet another object is to provide thin layers of gelled hydroxyl polymers which are not distintegrated or dissolved by prolonged water washing at temperatures between 25° and 100° C. Still other objects will be apparent from the following description of the invention.

The foregoing objects are achieved in accordance with this invention by treating an aqueous solution or colloidal dispersion containing a water-sensitive synthetic hydroxyl polymer, particularly such a polymer having a molecular weight between 5,000 and 200,000 with a water soluble amorphous organotitanium compound comprising the reaction product of one mol of an orthotitanate of the general formula Ti(OR)$_4$, wherein R is an alkyl radical of 1 to 8 carbon atoms, with ½ to 4 mols of a saturated mono-, di-, or tri-carboxylic acid of 2 to 6 carbon atoms having a hydroxyl group in the alpha-position to any carboxyl radical thereof. X-ray patterns of these compounds show complete absence of crystallinity. The treatment results in the formation of firm, rigid gels which are permeable to water and aqueous solutions, including photographic developing and fixing solutions, but which are not dissolved or appreciably softened by pH changes within the range 2 to 12, by prolonged water washing, by treatment with hot water at temperatures to 75° C., nor by treatment with hot aqueous photographic processing solutions, e. g., developing, bleaching, fixing, toning solutions, etc.

In making the organo-titanium compounds used as gelling agents in accordance with this invention, the reaction can be carried out advantageously at a temperature from 15° C. to 60° C., preferably in the presence of a solvent for the reactants which is a non-solvent for the reaction products, as described in Shacklett U. S. application Serial No. 411,020, filed February 17, 1954. Suitable solvents include acetone, methyl ethyl ketone, diethyl ether, diisopropyl ether, methyl propyl ether, dioxane and ethyl acetate.

The organo-titanium compounds in question are white, amorphous substances which are quite soluble in water and in aqueous methanol, ethanol and other water-soluble alcohols. The analyses of these substances indicate that they contain alkyl groups from the tetraalkyl titanates, as well as residues from the hydroxyl-substituted acids. They are polymeric substances, i. e., they contain more than one atom of titanium per molecule. Their structure is not known, but due to the hexaco-valency of titanium are believed to be complex condensation products. The products are soluble in water to the extent of 500 to 600 grams per liter of solution. They are also soluble in acid soltuions of pH 4 to 7 and in basic solutions of pH 7 to 8, to about the same extent.

In my copending application Serial No. 411,020, filed February 17, 1954, there are described and claimed organotitanium compounds of the foregoing type as well as processes of making them from lactic acid, glycolic acid, tartaric acid, α-hydroxybutyric acid, glyceric acid and citric acid, and tetramethyl-, tetraethyl-, tetrapropyl-titanates; tetraisopropyl, the tetrabutyl, tetraamyl, tetrahexyl, tetraheptyl, and tetraoctyl titanates, and tetra(2-ethylhexyl) titanate. When lactic acid is used it may be pure lactic acid or water may be present e. g., 85% to 99% strength or more.

In general, from 1/1000 to 1 part by weight of organo-titanium compound per part by weight of hydroxyl polymer should be used. The treatment may be carried out over a wide temperature range. A practical range being 20° C. to 70° C. The treatment can be carried out with the hydroxyl polymer being in solution in bulk, in layer, film, fiber, or other shaped form, or in the form of a viscous coating.

A practical process of gelling thin layers of hydroxyl polymer is to first apply a layer or stratum comprising or containing the organo-titanium compound in question, to the surface of the support to be coated and then to apply the coating of hydroxyl polymer from an aqueous solution or colloidal dispersion. Thus, the organo-titanium compound can be applied from an aqueous solution or dispersion, which may contain water miscible solvents, e. g., ethanol, containing polyvinyl alcohol or other hydroxy-containing polymers. Rapid gel formation ocurs in the applied layer by interaction of the two layers. Apparently there is some migration of the water-soluble organo-titanium compound from the lower layer to the applied layer.

The invention is useful in gelling hydroxyl polymers of quite diverse constitutions and properties, including starch, cellulose derivatives which are water-soluble or hydrophilic in character, e. g., low substituted cellulose acetate, methyl cellulose, ethyl cellulose, cellulose glycolic acid, etc. It is especially useful with synthetic hydroxyl polymers containing a plurality of recurring intra-linear vinyl alcohol $(-CH_2-CHOH)$ units or groups that are water-soluble or hydrophilic in character. Suitable polymers of this type include polyvinyl alcohol, partly hydrolyzed polyvinyl esters, and the ethers and acetals of such polymers.

The invention is especially useful for gelling or cross linking the hydroxyl copolymers of my applications Serial No. 415,161, filed March 9, 1954, and Serial No. 415,162, filed March 9, 1954. The copolymers of the first application contain three or more different types of units, one including extra-linear N-substituted amide groups containing alpha or beta glycol groups, another including extralinear N-substituted amide groups containing betaine groups and the third including extralinear unsubstituted or alkyl substituted amide groups free from betaine and glycol substituents. These novel copolymers contain a plurality of intralinear units of the formulae:

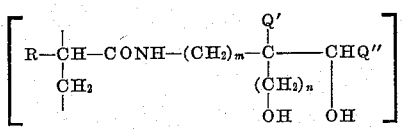

I wherein R is a member taken from the group consisting of hydrogen, alkyl of 1 to 3 carbon atoms, phenyl and cyclohexyl, Q' and Q'' are members taken from the group consisting of hydrogen and alkyl of 1 to 3 carbon atoms, $m$ is 0, 1, 2, 3, or 4, and $n$ is 0 or 1;

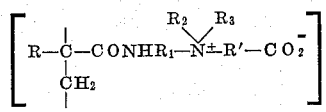

II wherein R is a member taken from the group consisting of hydrogen, alkyl radicals of 1 to 3 carbon atoms, phenyl and cyclohexyl, $R_1$ is a saturated bivalent aliphatic hydrocarbon radical of 2 to 6 carbon atoms, $R_2$ is an alkyl radical of 1 to 3 carbon atoms, $R_3$ is an alkyl radical of 1 to 3 carbon atoms, and R' is a saturated bivalent aliphatic hydrocarbon radical of 1 to 4 carbon atoms; and

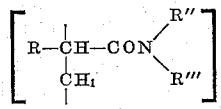

III wherein R, R'' and R''' are members taken from the group consisting of hydrogen, alkyl of 1 to 3 carbon atoms, phenyl and cyclohexyl. These copolymers may contain 1, 2 or more different units of each of Formula I, II, and III, as will be apparent from the following general description and working examples of the preparation of the novel copolymers. Suitable alkyl radicals comprehended by the above formulae include methyl, ethyl, propyl, and isopropyl. In the case of $(CH_2)_m$, the useful radicals are methylene, bimethylene, trimethylene, and tetramethylene.

The copolymers of the second application (Serial No. 415,162) contain recurring intralinear units of the formula:

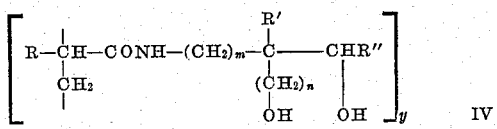

IV wherein R is a member taken from the group consisting of hydrogen, alkyl of 1 to 3 carbon atoms, phenyl and cyclohexyl, R' is a member taken from the group consisting of hydrogen and alkyl of 1 to 3 carbon atoms, R'' is a member taken from the group consisting of hydrogen and alkyl of 1 to 3 carbon atoms, $m$ is a cardinal number from 0 to 4, $n$ is a cardinal number from 0 to 1 and $y$ represents the number of units in the copolymer.

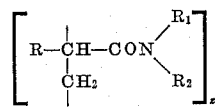

V where R, $R_1$ and $R_2$ are members taken from the group consisting of hydrogen, alkyl of 1 to 3 carbon atoms, phenyl and cyclohexyl, in which suitable alkyl radicals include methyl, ethyl, propyl, and isopropyl, and $z$ represents the number of units in the copolymer. The foregoing copolymers which have molecular weights of 5,000 to 200,000 or more can be made by the process described in the foregoing applications. Any of the copolymers disclosed in said applications can be used in accordance with the present invention.

The invention will be further illustrated but is not intended to be limited by the following examples wherein the parts stated are by weight unless otherwise indicated and when light-sensitive silver halides are present the operations are carried out in the absence of actinic light.

*Example I*

Five (5) parts of a 1% by weight aqueous solution of the organo-titanium complex formed by reaction of lactic acid with tetraisopropyl titanate (as described in Example I of application Serial No. 411,020, filed February 17, 1954) was added to 50 parts of a 5% solution of a medium viscosity polyvinyl alcohol. A gel was formed which was stable in acidic, neutral, and alkaline solutions and which did not dissolve when warmed to 180° F.

*Example II*

An experiment similar to that of Example I was run with a copolymer made by the addition polymerization of 50 mol percent of methacrylamide, 20 mol percent of N,2-methacrylamidoethyl N,N-dimethyl-β-aminopropionate betaine and 30 mol percent of N,2,3-dihydroxypropylmethacrylamide in the presence of α,α'-azobis-(isobutyramidine hydrochloride) as described in application Serial No. 415,161, instead of polyvinyl alcohol. The results were as described in Example I.

*Example III*

A substratum was prepared by coating a photographic film base with a 5% by weight solution of the complex formed by the reaction of tetraisopropyl titanate with lactic acid (85 to 100% strength), as described in Example I of application Serial No. 411,020, filed February 17, 1954. A photographic emulsion the binder of which was a partially acetalized polyvinyl alcohol which had been acetalized with o-sulfobenzaldehyde glycol and with m - (3 - methyl - 2 - hydroxybenzamido) - benzaldehyde ethylene glycol acetal, (described in U. S. Patent 2,489,655, and British Patent 662,793), was coated over the aforementioned substratum. The emulsion layer gelled rapidly and when it had dried it was subjected to running water at 160° F. for 15 minutes. The gelled photographic emulsion showed no tendency to dissolve or disintegrate. Similar films gelled by use of borate ion instead of the titanium compound completely dissolved within one minute.

*Example IV*

A multilayer color photographic film similar to that described in Example V of Alles and Saner, Serial No. 290,332, filed May 27, 1952, bearing hydrophilic polyvinyl acetal color former silver halide emulsion layers and an intercalated layer of polyvinyl alcohol except that a cellulose acetate film base was used, was soaked for ten minutes in a 5% by weight aqueous solution of the titanium compound of Example I (this application). The resulting film was exposed and processed as follows:

(1) Developed for 10 minutes at 68° F. in a solution having the following composition:

| | Grams |
|---|---|
| Para-aminodiethylaniline hydrochloride | 2.5 |
| Sodium sulfite | 10.0 |
| Sodium carbonate | 46.8 |
| Potassium bromide | 2.0 |

Water to make 1 liter.

(2) Given a 30-second rinse in water, (3) Treated for 5 minutes at 68° F. in the following fixing bath:

| | | |
|---|---|---|
| Sodium thiosulfate | grams | 240.0 |
| Sodium sulfite | do | 15.0 |
| Sodium tetraborate | do | 18.0 |
| Glacial acetic acid | cc | 12.0 |
| Potassium aluminum sulfate | grams | 20.0 |

Water to make 3 liters.

(4) Given a 5-minute rinse in water, (5) Treated for 5 minutes at 68° F. in the following bleaching bath:

| | Grams |
|---|---|
| Potassium ferricyanide | 100.0 |
| Boric acid | 10.0 |
| Sodium tetraborate | 5.0 |

Water to make 1 liter.

(6) Given a 3-minute rinse in water, (7) Given a 5-minute treatment at 68° F. in the following fixing bath:

| | Grams |
|---|---|
| Sodium thiosulfate | 200.0 |

Water to make 1 liter.

(8) Given a 10-minute rinse in water.

The wet and dry anchorage, after processing, were found to be satisfactory. The titanate-treated film showed no evidence that its photographic characteristics had been impaired. To determine if higher temperatures would impair the physical characteristics of the film, it was treated with running water at 160° F. for 10 minutes. It was found that there was no tendency for the emulsion to dissolve or disintegrate. Similar treatment of the original film (not treated with the titanium solution) caused dissolution of the emulsion within one minute.

*Example V*

Ten (10) parts of a 5% by weight aqueous solution of the titanium compound of Example I were added to 1000 parts of a photographic silver halide emulsion the binder of which was a polyvinyl alcohol which had been partially acetalized with o-sulfobenzaldehyde and with m-benzoylacetamidobenzaldehyde ethylene glycol acetal (described in U. S. Patent 2,464,597 and British Patent 627,353), said polyvinyl acetal being described in Example 3 of U. S. Patent 2,513,190. The emulsion was coated on a suitable support and dried. A similar coating was made of an emulsion without the titanium compound. The dried films were then subjected to normal photographic processing solutions, as described in Example IV hereof. The titanate-treated film remained firm whereas the untreated film softened and disintegrated in the solutions. The photographic characteristics of the film were not impaired by the titanate treatment.

*Example VI*

An experiment was run similar to that of Example III but with a photographic silver halide emulsion, the binder of which was the methacrylamide copolymer of Example II. The photographic layer obtained when this coating was dried was much more resistant to swelling and disintegration by water and aqueous solutions than was a similar film made without the titanate treatment.

*Example VII*

A photographic silver halide emulsion of the type described in Example V but without added titanate, was coated on a suitable film base and dried. It was then overcoated with a 3% by weight aqueous solution of the titanium compound mentioned in Example III. After being re-dried the film was subjected to running water at 150° F. for 10 minutes, with no observable tendency to dissolve of disintegrate. The emulsion of a similar film without titanate treatment dissolved completely within ½ minute when treated in this way.

*Example VIII*

A strip of the photographic film described in Example IV was exposed in a photographic sensitometer and soaked in a 5% by weight aqueous solution of the titanate compound of Example III. It was then processed in the photographic processing solutions described in Example IV. Its photographic characteristics were not impaired and it was treated with running water at 150° for ten minutes, with no sign of disintegration. A similar piece of film not treated with the titanate solution began to soften and dissolve within two to three minutes under this treatment.

*Example IX*

Five (5) parts of a 4% by weight aqueous solution of the titanium compound of Example III was added to 500 parts of a photographic silver halide emulsion, the binder of which was a partially acetalized polyvinyl alcohol made by reacting 100 parts of polyvinyl alcohol (medium viscosity) with 7 parts of sodium o-sulfobenzaldehyde and 13 parts of benzaldehyde. The emulsion was coated on a suitable support and dried. A similar coating was made using boric acid as the gelling agent instead of the titanium compound. The resulting photographic elements were exposed and processed as follows:

(1) Developed for five minutes at 70° F. in a solution made by admixing the following components:

| | | |
|---|---|---|
| Water | cc | 750.0 |
| N-methyl p-aminophenol hydrosulfate | grams | 3.0 |
| Sodium sulfite (anhydrous) | do | 45.0 |
| Hydroquinone | do | 12.0 |
| Sodium carbonate monohydrate | do | 79.0 |
| Potassium bromide | do | 1.9 |

Water to make 1 liter.

(2) Rinsed in cold water at 65° F. for 30 seconds, (3) Fixed for seven minutes at 68° F. in a solution made by admixing the following components:

| | | |
|---|---|---|
| Sodium thiosulfate crystals | grams | 240.0 |
| Sodium sulfite (anhydrous) | do | 15.0 |
| Borax | do | 18.0 |
| Glacial acetic acid | cc | 12.0 |
| Potassium alum | grams | 20.0 |

Water to make 1 liter.

(4) Washed in water at 65° F. for 10 minutes and dried.

The elements were then subjected to running water at 135° F. for five minutes. The treatment produced no tendency for the titanate gelled layer to dissolve or disintegrate while the borate gelled layer completely dissolved in one minute.

As previously stated, the invention is useful in gelling or rendering less soluble, or less water-sensitive, various hydroxyl polymers, including those which are quite soluble in water and those which are only mildly swollen by aqueous solutions. The soluble types are gelled but remain hydrophilic in character. However, if relatively large amounts of the organo-titanium complex is used, the hydroxyl polymers can be rendered quite water-insoluble. Those having hydrophilic character can be slightly or moderately modified so that their resulting films or fibers are still freely water-permeable, or they can be materially modified and converted into quite water-insensitive or even insoluble, films, filaments or fibers.

The invention is particularly useful in gelling thin layers of aqueous solutions or colloidal dispersions of hydroxyl polymers and especially in coating and rapidly gelling such layers in the manufacture of photographic elements. These solutions or dispersions may contain light-sensitive silver halides, color-formers, optical sensitizing dyes, antiplumming or antibronzing agents, etc., or mixtures of these constituents, in the case of coating and gelling light-sensitive silver halide emulsion layers. In the case of coating antihalation, filter layers, etc., the compositions may contain antihalation dyes or pigments, comminuted silver, etc. The compositions may contain minor amounts of other colloids, e. g., gelatin, albumin, the copolymers described in Shacklett application Serial No. 415,163 filed March 9, 1954, etc.

In place of the specific hydroxyl polymers used in the foregoing examples, one may substitute various other specific hydroxyl polymers. As examples of additional suitable polyvinyl acetal color formers mention may be made of those described in U. S. Patents 2,310,943, 2,320,422, 2,397,864 and 2,397,865.

Among the additional useful copolymers of application Serial No. 415,162, filed March 9, 1954, mention may be made of poly(N,2,3-dihydroxypropylmethacrylamide co methacrylamide), poly(N,2,3-dihydroxypropylacrylamide co methacrylamide), poly(N,1,3-dihydroxyisopropylmethacrylamide co methacrylamide), poly(N,1,3-dihydroxyisopropylacrylamide co methacrylamide), and poly(N,2,3-dihydroxypropylmethacrylamide co acrylamide), wherein the first component constitutes 10 to 70 mol percent of the copolymer. Among the additional useful copolymers of application Serial No. 415,161, filed March 9, 1954, mention may be made of poly(N,2,3-dihydroxypropylmethacrylamide co N,3-methacrylamidopropyl-N,N-dimethyl-$\beta$-aminopropionate betaine co methacrylamide), poly(N,2,3-dihydroxypropylacrylamide co N,3-acrylamidopropyl-N,N-dimethyl-$\beta$ - aminopropionate betaine co methacrylamide), poly(N,2,3-dihydroxypropylacrylamide co N,2-acrylamidoethyl-N,N-dimethyl-$\beta$-aminopropionate betaine co methacrylamide), poly(N,2,3-dihydroxypropylacrylamide co N,3-methacrylamidopropyl-N,N-dimethyl-$\beta$-aminopropionate betaine co methacrylamide), wherein the first unit comprises 5 to 60, the second 5 to 60 and the third 30 to 90 mol percent of the copolymer. The above copolymers have been named in the approved manner of the International Union of Pure and Applied Chemistry (see Journal of Polymer Science, vol. VIII, No. 3, pages 257–277).

The invention is useful in the preparation of photographic elements for various purposes. Thus it is useful in the preparation of photographic elements, such as motion picture and portrait films, lithographic film, printing plates, photographic papers, etc.

An advantage of the invention is that it provides a simple and effective process for rapidly reducing the solubility characteristics of hydroxyl polymers. Another advantage is it provides a practical process for rapidly gelling thin layers of neutral aqueous solutions or colloidal dispersions of hydroxyl polymers. An important advantage of the invention is that it provides a simple method for gelling synthetic hydroxyl polymer silver halide emulsion layers. A further advantage is that the gelling of such layers can be efficiently controlled. A still further advantage is that it provides uniform coatings because the emulsions do not substantially vary in viscosity during a coating operation. Since the gelling agents do not have to be added to the coating solutions of the silver halide emulsions, the danger of having them set up or gel prior to coating can be avoided. A further advantage resides in the fact that no undesirable color is imparted from the novel gelling agents. Still other advantages will be apparent from the above description of the invention.

The embodiments of the invention in which an exclusive property or privilege is claimed are defined as follows:

1. The process of reducing the water-sensitivity of a synthetic hydroxyl polymer which comprises treating, at pH 4 to 10, an aqueous composition containing a water-sensitive synthetic hydroxyl polymer with $\frac{1}{1000}$ to 1 part by weight of a water-soluble, amorphous organo-titanium compound comprising the complex condensation product of one mol of an ortho-titanate of the formula $Ti(OR)_4$ where R is an alkyl radical of 1 to 8 carbon atoms with $\frac{1}{2}$ to 4 mols of a saturated aliphatic hydroxy carboxylic acid of 2 to 6 carbon atoms having 1 to 3 carboxylic acid groups, the hydroxyl groups being in the $\alpha$-position to a carboxylic acid radical thereof, per part by weight of said hydroxyl polymer.

2. A process as set forth in claim 1 wherein said polymer contains a large number of recurring intralinear

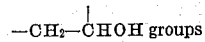
—CH$_2$—CHOH groups

3. A process as set forth in claim 2 wherein said polymer is a polyvinyl acetal containing color-former nuclei.

4. A process as set forth in claim 2 wherein said polymer is an addition copolymer having its chain composed solely of carbon atoms and containing extralinear N-substituted amide groups having glycol units the hydroxy groups of which are separated by no more than three carbon atoms.

5. A process as set forth in claim 4 wherein said copolymer is an addition copolymer containing recurring units of the formula:

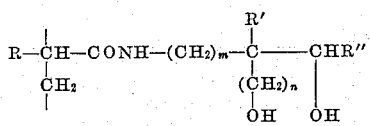

and

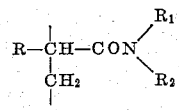

wherein R is a member taken from the group consisting of hydrogen, alkyl of 1 to 3 carbon atoms, phenyl and cyclohexyl, R' and R'' are members taken from the group consisting of hydrogen and alkyl of 1 to 3 carbon atoms, $m$ is a cardinal number taken from the group consisting of 0, 1, 2, 3, and 4, $n$ is a cardinal number taken from the group consisting of 0 and 1, $R_1$ and $R_2$ are members taken from the group consisting of hydrogen, alkyl of 1 to 3 carbon atoms, phenyl and cyclohexyl.

6. A process as set forth in claim 4 wherein said copolymer is an addition copolymer containing a substantial number of recurring intralinear units of the formulae:

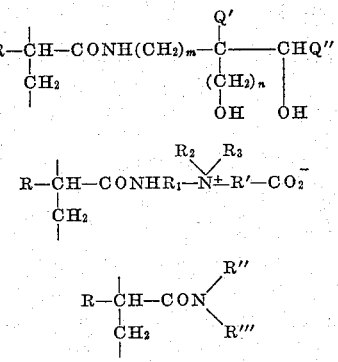

wherein R', R'' and R''' are members taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, R' is a saturated bivalent aliphatic hydrocarbon radical containing 1 to 4 carbon atoms, Q' and Q'' are members taken from the group consisting of hydrogen and alkyl radicals of 1 through 3 carbon atoms, $m$ is a number taken from the group consisting of 0, 1, 2, 3, and 4, and $n$ is a number taken from the group consisting of 0 and 1.

7. The process of gelling thin layers of synthetic hydroxyl polymers which comprises applying to a support a layer comprising a water-soluble, amorphous organo-titanium compound comprising the complex condensation product of one mol of an ortho titanate of the formula Ti(OR)$_4$ where R is an alkyl radical of 1 to 8 carbon atoms with ½ to 4 mols of a saturated aliphatic hydroxy carboxylic acid of 2 to 6 carbon atoms having 1 to 3 carboxylic acid groups, the hydroxyl groups being in the α-position to a carboxylic acid radical thereof and coating the resulting layer with a layer from a viscous aqueous solution containing a water-sensitive synthetic hydroxyl polymer.

8. The process of gelling thin layers of synthetic hydroxyl polymers which comprises applying to a support a layer comprising a water-soluble, amorphous organo-titanium compound comprising the complex condensation product of one mol of an ortho titanate of the formula Ti(OR)$_4$ where R is an alkyl radical of 1 to 8 carbon atoms with ½ to 4 mols of a saturated aliphatic hydroxy carboxylic acid of 2 to 6 carbon atoms having 1 to 3 carboxylic acid groups, the hydroxyl groups being in the α-position to a carboxylic acid radical thereof and coating the resulting layer with a layer from a viscous aqueous solution containing a water-sensitive synthetic hydroxyl polymer having dispersed therethrough light-sensitive silver halide grains.

9. A process as set forth in claim 8 wherein said polymer contains a large number of recurring intralinear

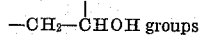 groups

10. The process of reducing the water-sensitivity of a film essentially comprising a water-sensitive synthetic hydroxyl polymer which comprises treating said film at pH 4 to 10 with an aqueous solution containing 1/1000 to 1 part by weight of a water-soluble, amorphous organo-titanium compound comprising the complex condensation product of one mol of an ortho titanate of the formula Ti(OR)$_4$ where R is an alkyl radical of 1 to 8 carbon atoms with ½ to 4 mols of a saturated aliphatic hydroxy carboxylic acid of 2 to 6 carbon atoms having 1 to 3 carboxylic acid groups, the hydroxyl groups being in the α-position to a carboxylic acid radical thereof, per part by weight of said hydroxyl polymer.

11. The process of reducing the water-sensitivity of a film essentially comprising a water-sensitive synthetic hydroxyl polymer having dispersed therethrough light-sensitive silver halide grains which comprises treating said film at pH 4 to 10 with an aqueous solution containing 1/1000 to 1 part by weight of a water-soluble, amorphous organo-titanium compound comprising the complex condensation product of one mol of an ortho titanate of the formula Ti(OR)$_4$ where R is an alkyl radical of 1 to 8 carbon atoms with ½ to 4 mols of a saturated aliphatic hydroxy carboxylic acid of 2 to 6 carbon atoms having 1 to 3 carboxylic acid groups, the hydroxyl groups being in the α-position to a carboxylic acid radical thereof, per part by weight of said hydroxyl polymer.

12. A process as in claim 11 wherein said polymer is an addition copolymer having its chain composed solely of carbon atoms and containing extralinear N-substituted amide groups having glycol units the hydroxyl groups of which are separated by no more than three carbon atoms.

13. A process as set forth in claim 12 wherein said copolymer is an addition copolymer containing recurring units of the formula:

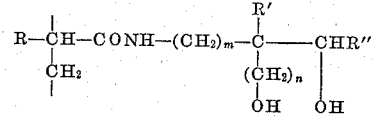

and

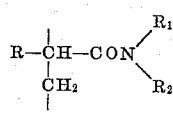

Wherein R is a member taken from the group consisting of hydrogen, alkyl of 1 to 3 carbon atoms, phenyl and cyclohexyl, R' and R'' are members taken from the group consisting of hydrogen and alkyl of 1 to 3 carbon atoms, $m$ is a cardinal number taken from the group consisting of 0, 1, 2, 3, and 4, $n$ is a cardinal number taken from the group consisting of 0 and 1, R$_1$ and R$_2$ are members taken from the group consisting of hydrogen, alkyl of 1 to 3 carbon atoms, phenyl and cyclohexyl.

14. A process as set forth in claim 13 wherein said copolymer is an addition copolymer containing a substantial number of recurring intralinear units of the formulae:

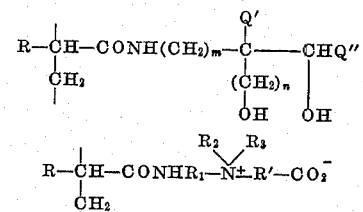

and

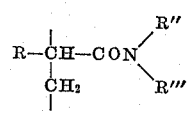

wherein R, R'' and R''' are members taken from the group consisting of hydrogen, alkyl of 1 to 3 carbon atoms, phenyl and cyclohexyl, R$_1$ is a saturated bivalent aliphatic hydrocarbon radical of 2 to 6 carbon atoms, R$_2$ and R$_3$ are alkyl radicals of 1 to 3 carbon atoms, R' is a saturated bivalent aliphatic hydrocarbon radical containing 1 to 4 carbon atoms, Q' and Q'' are members taken from the group consisting of hydrogen and alkyl radicals of 1 through 3 carbon atoms, $m$ is a number taken from the group consisting of 0, 1, 2, 3, and 4, and $n$ is a number taken from the group consisting of 0 and 1.

References Cited in the file of this patent

UNITED STATES PATENTS

| 2,258,718 | Rothrock | Oct. 14, 1941 |
| 2,489,651 | Langkammerer | Nov. 29, 1949 |
| 2,518,193 | Signaigo | Aug. 8, 1950 |